US012140728B2

United States Patent
Gail

(10) Patent No.: US 12,140,728 B2
(45) Date of Patent: Nov. 12, 2024

(54) USING MOBILE DATA TO IMPROVE WEATHER INFORMATION

(71) Applicant: GOOGLE LLC, Mountain View, CA (US)

(72) Inventor: William B. Gail, Boulder, CO (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/938,147

(22) Filed: Oct. 5, 2022

(65) Prior Publication Data

US 2023/0103168 A1    Mar. 30, 2023

Related U.S. Application Data

(63) Continuation of application No. 16/864,377, filed on May 1, 2020, now Pat. No. 11,506,816.

(51) Int. Cl.
| | |
|---|---|
| *G01W 1/10* | (2006.01) |
| *G01W 1/06* | (2006.01) |
| *G06F 13/00* | (2006.01) |
| *G01W 1/00* | (2006.01) |

(52) U.S. Cl.
CPC ........ *G01W 1/10* (2013.01); *G01W 2001/006* (2013.01); *G01W 1/06* (2013.01); *G01W 2203/00* (2013.01); *G06F 13/00* (2013.01); *Y02A 90/10* (2018.01)

(58) Field of Classification Search
CPC ............. G01W 1/10; G01W 2001/006; G01W 2203/00; G01W 1/06; G06F 13/00; Y02A 90/10
See application file for complete search history.

(56) References Cited

U.S. PATENT DOCUMENTS

| 10,317,575 B2 | 6/2019 | Gail et al. |
| 2015/0379408 A1 | 12/2015 | Kapoor et al. |
| 2016/0116640 A1 | 4/2016 | Phillips et al. |
| 2017/0017014 A1 | 1/2017 | Kleeman et al. |

(Continued)

FOREIGN PATENT DOCUMENTS

| JP | 2003215266 A | 7/2003 |
| KR | 20150059023 A | 5/2015 |

(Continued)

OTHER PUBLICATIONS

International Search Report from PCT Application No. PCT/US2021/026205, Jul. 7, 2021, 5 pages.

(Continued)

*Primary Examiner* — Manish S Shah
*Assistant Examiner* — Christian T Bryant
(74) *Attorney, Agent, or Firm* — Brake Hughes Bellermann LLP

(57) ABSTRACT

A system for using mobile data to improve weather information is provided. The system includes a weather prediction station configured to receive stationary observation data provided by a plurality of stationary weather stations along with data from a plurality of input weather models and generate unified weather model estimates based on the stationary observation data, the input weather model data, and a processor. The processor is configured to aggregate mobile observation data provided by a plurality of non-stationary sensors and use the aggregated mobile observation data to adjust the weather model estimates.

20 Claims, 3 Drawing Sheets

(56) References Cited

U.S. PATENT DOCUMENTS

2017/0322342 A1   11/2017   Gail et al.
2017/0351005 A1   12/2017   Alvarez et al.

FOREIGN PATENT DOCUMENTS

WO   2014161082 A1   10/2014
WO   2019219664 A1   11/2019

OTHER PUBLICATIONS

Sukuvaara, et al., Connected vehicle safety network and road weather forecasting—the WiSafeCar project, Proceedings of the SIRWEC (https://www.academia.edu/download/43494551/ID_001_Connected_vehicle_safety_network_20160308-24876-1dldyjm.pdf), 2012, 6 pages.
International Preliminary Report on Patentability for PCT Application No. PCT/US2021/026205, mailed on Nov. 10, 2022, 9 pages.

USING MOBILE DATA TO IMPROVE WEATHER INFORMATION

CROSS REFERENCE TO RELATED APPLICATION

This application is a continuation of, and claims priority to U.S. application Ser. No. 16/864,377, filed May 1, 2020, the disclosure of which is incorporated herein by reference in its entirety.

TECHNICAL FIELD

The embodiments described below relate to weather information and, more particularly, to using mobile data to improve the weather information.

BACKGROUND

There is growing interest in using mobile observations to improve the current conditions estimates and (future) forecasts produced by weather models. Mobile observations are attractive because they are available at large numbers of locations, such as when provided by mobile phones or vehicles. Yet these observations have several critical disadvantages, compared to observations from stationary sensors (e.g., weather stations), requiring novel methods to make them useful for improving weather model information.

For example, single observations, often from consumer-quality devices or sensors primarily intended for other purposes, tend to have low quality. Indeed, the quality is often significantly worse than what can be obtained from the weather models themselves. That makes it difficult to use individual mobile observations alone to improve the weather models. Also, by definition, mobile observations are made at locations that change regularly. In contrast, important weather modeling processes require a time series of data from a location to enable statistical processes. Additionally, in some cases, observations may be relevant but may not exactly match the information needed for, or produced by, weather models. For example, vehicle traction control system data may not relate unambiguously to whether a condition such as ice is present or not on a road; low traction values may correspond to ice but could also reflect other causes of low traction.

As a specific relevant example of this need for mobile observations, their use is of particular interest within the transportation-related sector, such as for providing accurate along-road weather-related information. This use includes both atmospheric weather conditions, such as temperature and wind, as well as "road weather", such as road surface temperature and weather-related conditions (e.g., dry, moist, wet, snow, ice—including amount).

Historically, observations of these parameters have been made at Road Weather Information System (RWIS) sites, located along roads and generally operated by governmental transportation agencies. As they are expensive to acquire and maintain, the number of existing RWIS is relatively small; they only sparsely sample the road network.

Accordingly, there is a need to use mobile data, particularly mobile data provided by plentiful and readily available mobile sensors, to improve weather information. There is also a need to improve the quality and suitability of the mobile data provided by the mobile sensors for use in improving the weather information.

SUMMARY

A system for using mobile data to improve weather information is provided. According to an embodiment, the system comprises a weather prediction station configured to receive stationary observation data provided by a plurality of stationary weather stations along with data from a plurality of input weather models and generate unified weather model estimates based on the stationary observation data, and the input weather model data. The system also comprises a processor configured to aggregate mobile observation data provided by a plurality of non-stationary sensors and use the aggregated mobile observation data to adjust the unified weather model estimates.

A method for using mobile data to improve weather information is provided. According to an embodiment, the method comprises receiving stationary observation data provided by a plurality of stationary weather stations, receiving data from a plurality of input weather models, generating unified weather model estimates based on the stationary observation data and the input weather model data, aggregating mobile observation data provided by a plurality of non-stationary sensors, and using the aggregated mobile observation data to adjust the unified weather model estimates.

According to an aspect, a system (100) for using mobile data to improve weather information comprises a weather prediction station (120) configured to receive stationary observation data provided by a plurality of stationary weather stations (110), receive data from a plurality of input weather models (115), and generate unified weather model estimates based on the stationary observation data, the input weather model data, and a processor (130). The processor (130) is configured to aggregate mobile observation data provided by a plurality of non-stationary sensors (140) and use the aggregated mobile observation data to adjust the unified weather model estimates.

Preferably, the processor (130) is further configured to determine virtual observation data based on the adjustment of the unified weather model estimates, the virtual observation data being an estimate of observation data that would have been provided by a plurality of non-existent stationary weather stations.

Preferably, the processor (130) being configured to determine virtual observation data based on the adjustment of the unified weather model estimates comprises the processor (130) being configured to determine climatological values based on the aggregated mobile observation data and use the climatological values to determine the virtual observation data.

Preferably, the processor (130) is further configured to use the virtual observation data to perform post-processing on a weather prediction model.

Preferably, the processor (130) being configured to use the aggregated mobile observation data to adjust the unified weather model estimates comprises the processor (130) being configured to spatially correlate the mobile observation data to a virtual observation location (230) and adjusting the weather model estimates at the virtual observation location (230).

Preferably, the processor (130) being configured to spatially correlate the aggregated mobile observation data to a virtual observation location (130) comprises the processor (130) being configured to determine a spatial correlation distance (dbinCORR) defining a distance over which an observation may be usefully extrapolated to adjust the weather model estimates.

Preferably, the mobile observation data provided by the plurality of non-stationary sensors (130) is organized by spatiotemporal bin (210) defined by location and time parameters.

Preferably, the system (100) further comprises a plurality of stationary weather stations (110) configured to provide the stationary observation data of weather conditions at the locations of the stationary weather stations (110).

According to an aspect, a method for using mobile data to improve weather information comprises receiving stationary observation data provided by a plurality of stationary weather stations, receiving data from a plurality of input weather models, generating unified weather model estimates based on the stationary observation data and the input weather model data, aggregating mobile observation data provided by a plurality of non-stationary sensors, and using the aggregated mobile observation data to adjust the unified weather model estimates.

Preferably, the method further comprises determining virtual observation data based on the adjustment of the unified weather model estimates, the virtual observation data being an estimate of observation data that would have been provided by a plurality of non-existent stationary weather stations.

Preferably, determining virtual observation data based on the adjustment of the unified weather model estimates comprises determining climatological values based on the aggregated mobile observation data and using the climatological values to determine the virtual observation data.

Preferably, the method further comprises using the virtual observation data to perform post-processing on a weather prediction model.

Preferably, using the aggregated mobile observation data to adjust the unified weather model estimates comprises spatially correlating the mobile observation data to a virtual observation location and adjusting the unified weather model estimates at the virtual observation location.

Preferably, spatially correlating the mobile observation data to a virtual observation location comprises determining a spatial correlation distance defining a distance over which an observation may be usefully extrapolated to adjust the unified weather model estimates.

Preferably, the mobile observation data provided by the plurality of non-stationary sensors is organized by spatiotemporal bin defined by location and time parameters.

BRIEF DESCRIPTION OF THE DRAWINGS

The same reference number represents the same element on all drawings. It should be understood that the drawings are not necessarily to scale.

DETAILED DESCRIPTION

Figure 1:
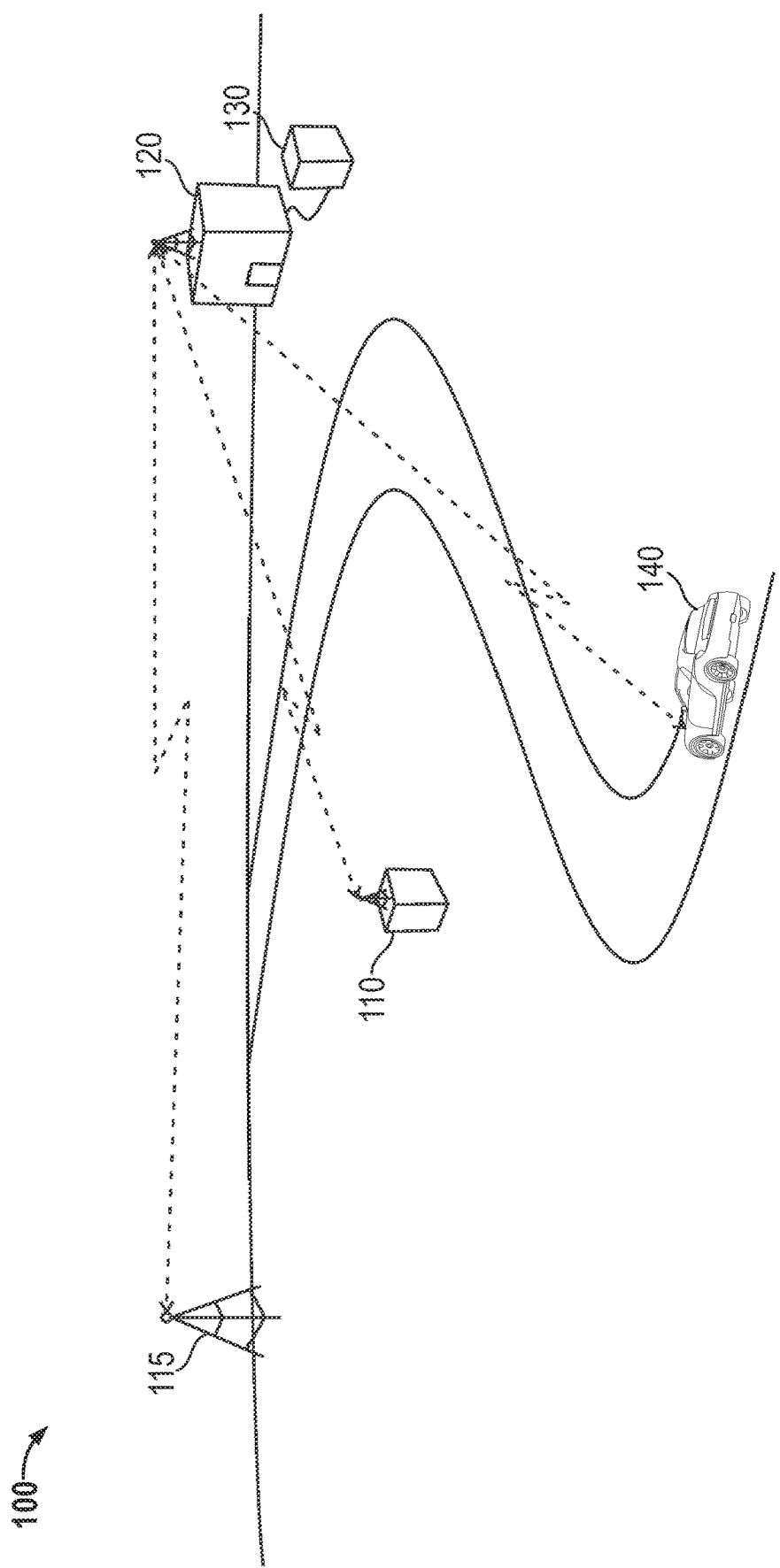
FIG. 1 shows a system 100 for using mobile data to improve weather information.
Figure 2:
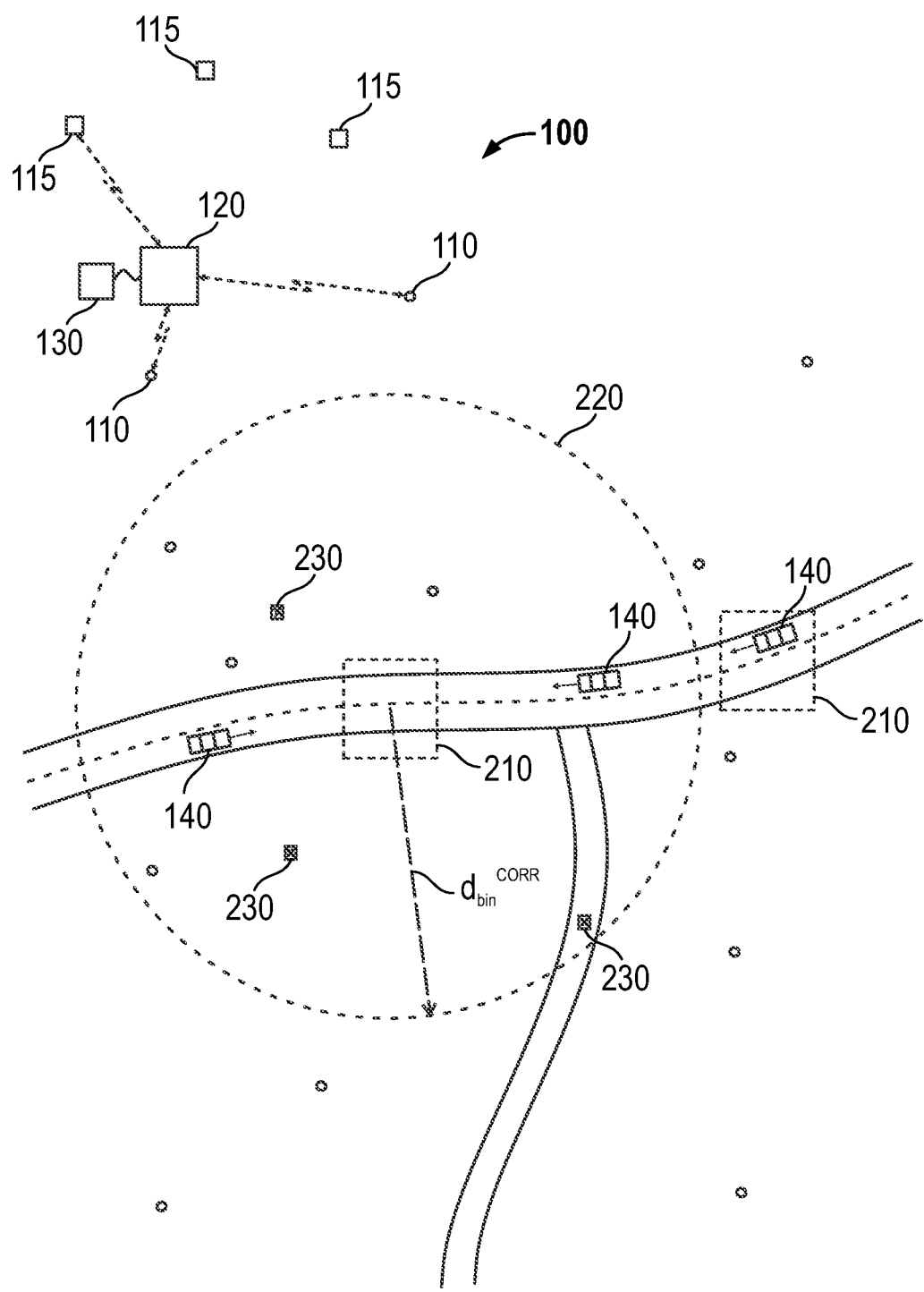
FIG. 2 shows another view of the system 100 depicted in FIG. 1.
Figure 3:
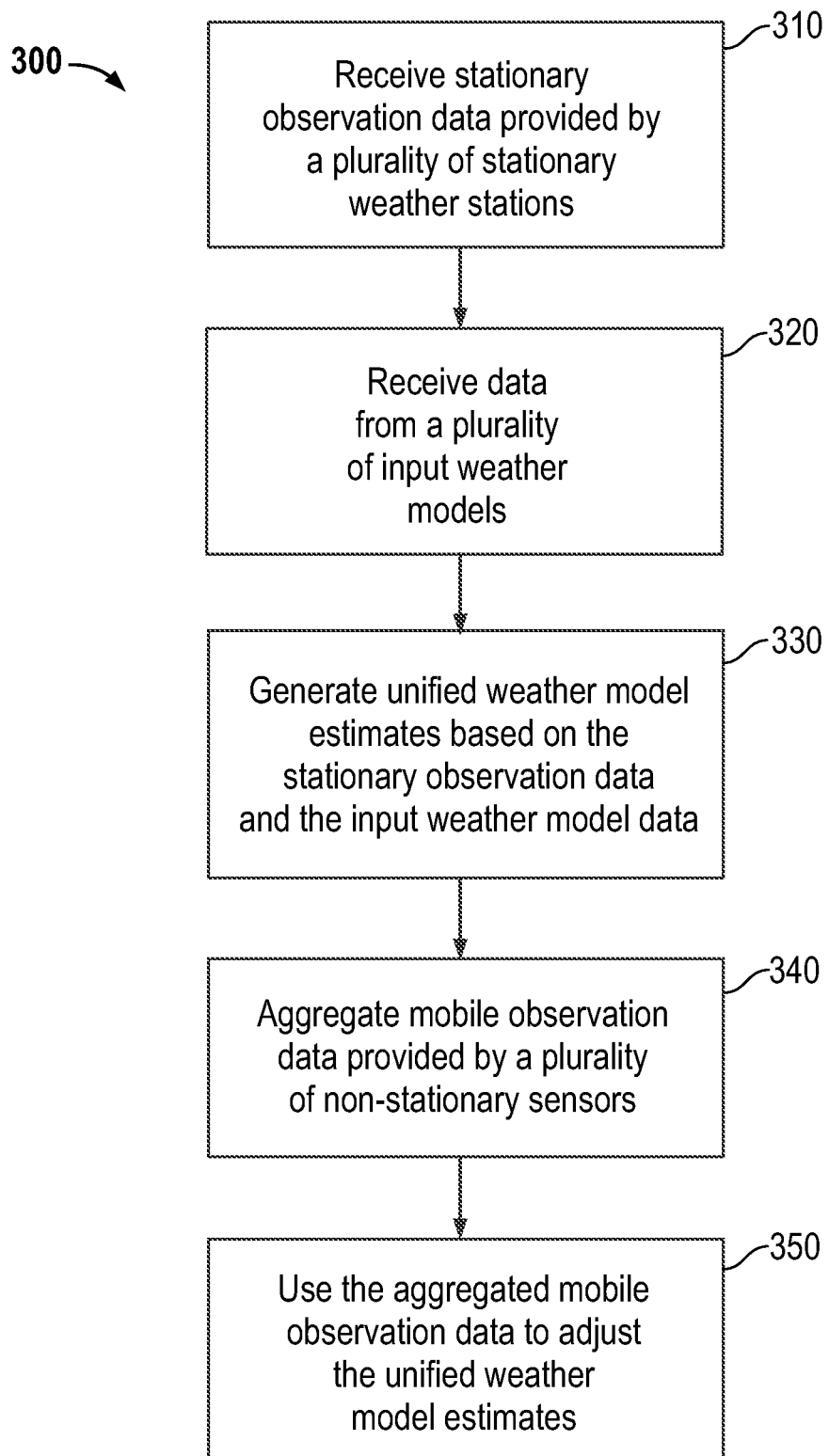
FIG. 3 shows a method 300 for using mobile data to improve weather information.

FIGS. 1-3 and the following description depict specific examples to teach those skilled in the art how to make and use the best mode of embodiments of using mobile data to improve weather information. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of using mobile data to improve weather information. As a result, the embodiments described below are not limited to the specific examples described below, but only by the claims and their equivalents.

FIG. 1 shows a system 100 for using mobile data to improve weather information. As shown in FIG. 1, the system includes a stationary weather station 110, an input weather model 115, and a weather prediction station 120. As shown in FIG. 1, the stationary weather station 110 and the weather prediction station 120 are communicatively coupled with each other. The weather prediction station 120 may be configured to receive stationary observation data provided by the stationary weather station 110. Additionally, or alternatively, the weather prediction station 120 may be configured to receive stationary observation data provided by one or more other stationary weather stations and model data from one or more other input weather models.

As shown in FIG. 1, the system 100 also includes a processor 130 that is communicatively coupled with the weather prediction station 120. As shown in FIG. 1, the processor 130 is separate from the weather prediction station 120, although the processor 130 may be part of the weather prediction station 120. Although the system 100 is shown as including the stationary weather station 110, the system 100 may be comprised of the weather prediction station 120 and the processor 130. The processor 130 may be configured to perform post-processing on a weather prediction model. With more specificity, the processor 130 may be configured to use virtual observations data of locations without stationary weather stations. The virtual observation data may be estimates of observation data that would have been provided by a non-existent stationary weather station. The virtual observation data may be based on mobile observation data, as is described in more detail in the following.

The system 100 may also include a non-stationary sensor 140 that is communicatively coupled with the processor 130. Although not shown, the non-stationary sensor 140 may be alternatively or additionally communicatively coupled to the weather prediction station 120 so as to receive or send data. For example, where the processor 130 is part of the weather prediction station 120, the non-stationary sensor 140 may be communicatively coupled with the weather prediction station 120. The data provided by the non-stationary sensor 140 may be mobile observation data.

The stationary weather station 110 may be configured to determine weather conditions at or proximate to the stationary weather station 110. Accordingly, the stationary weather station 110 may be configured to provide stationary observation data. The stationary observation data may include a plurality of stationary observation values that can be used by the weather prediction station.

The input weather model 115 is shown as being communicatively coupled to the weather prediction station 120. The input weather model 115 may include a weather model of an area that includes the system 100, such as a portion of system 100. A plurality of the input weather models 115 may provide data to the weather prediction station 120.

The weather prediction station 120 may use the stationary observation data to determine unified weather model estimates by generating data using one or more weather prediction model methods. That is, the unified weather model estimates may be based on the stationary observation data. The unified weather model estimates may include current condition estimates (e.g., for locations other than the stationary weather station) and/or (future) forecasts. The weather prediction station 120 may generate the unified weather model estimates based on one or more weather prediction models using any suitable method, as the following explains.

The weather prediction station 120 may assimilate the stationary observation data into Numerical Weather Prediction (NWP) models. A characteristic of this approach is that NWP models typically require an hour or more for computation, once observations are received, before the forecast is available. The "latency" may be undesirable when the desired information concerns using observations to improve estimates of current conditions or near-term (first hour or so) forecasts. To compensate for the latency and improve accuracy, among other things, the NWP model may be adjusted with additional "post-processing" steps using more current stationary observation data. The processor 130 may perform such post-processing. The accumulation of these steps, involving multiple input models and observational data, combined in ways that improve on each input, is referred to as the "unified" weather model.

For example, an NWP estimate of air temperature determined by the weather prediction model, computed using observations that are an hour old or more, may be different from the current observed temperature by 4° C. for any of several reasons. Post-processing performed by the processor 130 can adjust this model estimate to match the observed value using a compute process that takes minutes. Moreover, that observation-improved current condition estimate (and related near-term forecasts) of the stationary weather stations can be used to improve similar estimates/forecasts at locations in a region surrounding the observation location. Furthermore, availability of observations at locations having no stationary sensors can improve weather model information overall.

An input to post-processing performed by the processor 130 may consist of multiple NWP models along with observations. Post-processing can improve on the accuracy of the input NWP models, at the observation locations, in any of three or more steps, including but not limited to: a) statistical correction of individual NWP models through bias adjustment, b) guidance for consensus combinations of those models to generate an improved estimate/forecast, and c) ensuring the final estimate/forecast matches the observation for the current time at the observation location. A fourth step, added to extend post-processing to non-observation locations, involves adjusting model information using guidance from nearby observations by stationary observation locations. The stationary observation data may be used in each of the above four steps.

The stationary observation data produce an observation time-series at a single location. Accordingly, the observation time-series can be statistically analyzed as part of the post-processing for that location. In contrast, the mobile observation data for an individual mobile sensor 140 do not produce such a time-series for a fixed location, precluding such statistical analysis on the mobile observation data. To allow for post processing at a fixed location using the mobile observation data, the processor 130 may aggregate the mobile observation data. Such aggregation may involve grouping observations from multiple mobile sensors 140, organized into spatiotemporal bins associated with limited spatial distances and time periods. Moreover, the aggregated mobile observation data may be interpolated into virtual observation data. The virtual observation data may be for locations other than the location of the mobile observation data or the stationary weather stations, as will be described in more detail in the following with reference FIG. 2. The virtual observation data can be used as an input to all of the NWP generation and post-processing steps.

FIG. 2 shows another view of the system 100 depicted in FIG. 1. As shown in FIG. 2, the system 100 includes a plurality of the stationary weather stations 110 and input weather models 115 described above. The stationary weather stations 110 are represented as small circles and the input weather models 115 are depicted as small squares. The system 100 also includes the weather prediction station 120 and the processor 130 described above. The weather prediction station 120 and the processor 130 are communicatively coupled with each other. Only two of the plurality of the stationary weather stations 110 and only one of the input weather models 115 are shown as being communicatively coupled with the weather prediction station 120, although all of the stationary weather stations 110 and input weather models 115 may be communicatively coupled with the weather prediction station 120. A plurality of the non-stationary sensors 140 are also shown. The plurality of the non-stationary sensors 140 are shown as vehicles, or a part of the vehicles, although any suitable non-stationary sensor may be employed. The plurality of the non-stationary sensors 140 are shown as being on a two-lane road with arrows illustrating motion directions of the non-stationary sensors 140.

As shown in FIG. 2, the system 100 also includes spatiotemporal bins 210 that are shown as including a portion of the two-lane road shown in FIG. 2. As can be appreciated, when a plurality of the non-stationary sensors 140 traverse one of the spatiotemporal bins 210 during a determined time period, the mobile observation data provided by each of those non-stationary sensors 140 are in the same spatiotemporal bin 210 and therefore are representative of conditions, such as weather conditions, at a location and time of a given spatiotemporal bin 210. Spatially and temporally coincident mobile observation data from different non-stationary sensors 140 may be aggregated in a corresponding spatiotemporal bin 210.

Also shown is a spatial correlation region 220 that corresponds to one of the spatiotemporal bin 210. The spatial correlation region 220 is an area where an observation of the aggregated mobile observation data in the corresponding spatiotemporal bin 210 may be usefully extrapolated to adjust a weather prediction model at a given location. Such extrapolations may be the virtual observations discussed above and may be located at corresponding virtual observation locations 230 shown in FIG. 2, illustrated as boxes having an 'X'. The spatial correlation region 220 is defined by a spatial correlation distance dbinCORR for the corresponding spatiotemporal bin 210, as will be described in more detail in the following.

It should be noted that somewhat distinct branches of the method may be needed for continuous variables and discrete variables. Continuous variables are those whose value tends to vary smoothly in space and time over a continuous range. Examples include temperature, dew point, wind speed, liquid/frozen depth on road, and similar variables. Discrete variables have discrete levels. The discrete variables change discontinuously in space and/or time. Examples include road state (e.g., dry, moist, wet, snow, ice), precipitation occurrence, precipitation type, wiper status, and similar variables.

The methodology for generating virtual observations from mobile observations can include four steps: quality control and aggregation, compute climatology, compute spatial correlation, and compute virtual observations. Quality control and aggregation may be used because mobile observations are typically of lower quality than industrystandard stationary observations (such as those from weather stations at airports). Thus, new quality control processes may need to be applied to the mobile observation data. One means for reducing errors from individual mobile devices is to aggregate multiple observations into the spatiotemporal bins 210. For example, all vehicles located within a 1-km road segment during the course of an hour could be aggregated into a spatiotemporal bin with spatial size of 1-km and temporal size of 1 hour. This "aggregated observation" may include multiple statistical parameters, such as a mean and a variance. The number of samples in the spatiotemporal bin is related to the accuracy of this aggregated observation, so higher quality is likely at locations where more mobile observations are available. Techniques for inter-comparison of mobile devices having sensors (i.e., non-stationary sensors), such as when they are coincident in space-time, may also be important.

As to climatology, if the "aggregated observations" for a spatiotemporal bin are stored and accumulated over time, it is possible to compute aggregated observation climatological values. For example, aggregated observations of a variable for every hour over a one-month period could be averaged over that month to determine the mean value of the variable during that month at each bin location, perhaps as a function of time-of-day or other parameter to properly reflect expected climatological variability. The climatology may be computed for static periods, such as monthly, or for dynamic periods, such as trailing 30-days.

With respect to computing spatial correlations, drawing from the data used to compute the climatology, it is also possible to use the binned aggregated observations to compute the spatial correlation distance dbinCORR for each variable and each spatiotemporal bin 210. As mentioned above, the spatial correlation distance dbinCORR tells us the distance over which an observation may be usefully extrapolated to adjust prediction models at nearby locations. In some cases, it may be useful to compute this on a contingent basis, such as the correlation distance of road condition if snow is the predicted or observed road condition. The spatial correlation distance dbinCORR could also be computed as a function of spatial direction, such as a different value for each of the two travel directions along a road. Accordingly, the spatial correlation distance dbinCORR may be viewed as a vector originating from a location corresponding to a given spatiotemporal bin 210. Accordingly, although the spatial correlation region 220 is shown as a circle, other shapes may be employed. As with the climatology, the spatial correlation may be computed for static periods, such as monthly, or for dynamic periods, such as trailing 30-days, and may be a function of various parameters such as time of day.

With respect to computing virtual observations, the spatial correlation distance dbinCORR enables computation of a generally non-sparse set of observation-equivalents, which will be called "virtual observations", from potentially sparse real-time aggregated mobile observations. Virtual observations can then be input to NWP generation and to all stages of traditional post-processing: fine-scale model bias adjustment, location-specific consensus combination, real-time error correction, and extrapolation of observations in real-time. To understand the process for generating the virtual observations, suppose that for a given date/time we have an aggregated observation YA(AggObs) for variable Y at location A but no observation at location B, such as the virtual observation locations 230 shown in FIG. 2. The aggregated observation YA(AggObs) can be used to improve the weather information at location A, but we would also like to use it to improve the weather information at location B (it is expected that B may have one or more nearby locations A each with a valid aggregated observation, or may have no such locations A). To frame the solution, assume that the unified model estimates (see following description) are YA(UniModel) and YB(UniModel), the separation between sites A and B is dA,B, and the computed spatial correlation distance at location A is dACORR.

For continuous variables, virtual observations $Y^{(Virtual)}$ at locations A and B can be computed from the unified model estimates for locations A and B and the aggregated mobile observation at location A, using the following equations:

$$Y_n^{(Virtual)} = Y_n^{(UniModel)} - Y_n^{(ObsAdj)} \text{ for } n=A,B$$

where:

$Y_n^{(ObsAdj)}$ is an observation-based adjustment.
The observation-based adjustment $Y_n^{(ObsAdj)}$ may be defined as, for example:

$$Y_n^{(ObsAdj)} = Q_A K \cdot D_{A,B} \cdot (Y_A^{(UniModel)} - Y_A^{(AggObs)});$$

where:

K is a local or global user-defined sensitivity factor between 0 and 1, set to manage the desired overall sensitivity of the system to the mobile observations adjustment process;

$Q_n$ is a user-defined, location-based quality factor between 0 and 1; and $D_{A,B}$ is a factor based on the correlation distance, to reduce the applied adjustment as location separation increases.

The location-based quality factor $Q_n$ may be defined as, for example:

$$Q_n = H_n \cdot (s_0/s_n) \text{ for } s_n > s_0$$
$$= H_n \quad\quad s_n <= s_0;$$

where:

n is a location index (e.g., 'A' or 'B');

$s_n$ is a standard deviation reflecting uncertainty in the observation/climatology for variable Y at location n;

$s_0$ is a user-defined threshold uncertainty reflecting the maximum acceptable un-corrected error in the observations and climatology for variable Y for use in computing virtual observations; and $H_n$ is an observation ambiguity factor, nominally equal to 1 for many variables (discussed later in the document).

The correlation factor $D_{A,B}$ may be defined as, for example:

$$D_{A,B} = 1 - (d_{A,B}/(m \cdot d_A^{CORR})) \text{ for } d_{A,B} <= m \cdot d_A^{CORR}$$
$$= 0 \quad\quad\quad\quad\quad\quad\quad \text{for } d_{A,B} > m \cdot d_A^{CORR}.$$

where:

m is a user-set sensitivity factor, defining how many correlation distances should be adjusted.

There are three important cases of the correlation factor $D_{A,B}$. First, at location A, B=A so a distance may be computed as $d_{A,B}$->$d_{A,A}$=0 and thereby the resulting correlation factor $D_{A,B}$=1. Second, for where the distance $d_{A,B}$ equals $m \cdot d_A^{CORR}$ or less, the correlation factor $D_{A,B}$ will be 0<$D_{A,B}$<1. In this case, a distance-weighted A-observation-based adjustment will be made at location B. Third, for larger distances $d_{A,B}$, the spatial correlation factor $D_{A,B}$=0. In this case, no A-observation-based adjustment will be made at location B. In other words, the virtual observations at A and B are what one would expect.

That is, when the quality of the mobile observations is sufficiently high (i.e., $Q_A$ and K equal to 1), the virtual observation $Y_A^{(Virtual)}$ at location A simply takes on the value of the aggregated observation at A. As quality decreases, the virtual observation $Y_A^{(virtual)}$ at location A trends toward the unified model value. Similarly, the virtual observation $Y_B^{(virtual)}$ at location B equals the unified model value adjusted by a portion of the aggregated observation at A, that portion determined by the quality of the aggregated observation at A and the distance of B from A as compared to the computed correlation distance. If no adjustment is made, the virtual observation assumes the value of the unified model at B.

Updated estimates of quality, such as standard deviation, can be computed for each virtual observation derived from the underlying aggregated observation values. For locations impacted by multiple observations, the observation adjustment $Y_n^{(ObsAdj)}$ values can be accumulated from n neighboring observation locations $A_n$, each separated from B by less than some multiple m of the correlation distance, and added in a normalized manner such as by distance-weighting.

For discrete values, the virtual observations $Y^{(Virtual)}$ at locations A and B can be computed from the unified model estimates for locations A and B and the aggregated mobile observation at location A, using the following equations:

$$Y_A^{(Virtual)} = Y_A^{(AggObs)} \quad \text{for } Q_A >= Q^{thresh}$$
$$= Y_A^{(UniModel)} \quad \text{for } Q_A < Q^{thresh}$$
$$Y_B^{(Virtual)} = Y_A^{(AggObs)} \quad \text{for } Q_A >= Q^{thresh} \text{ and } d_{A,B} <= Q_A K(m \cdot d_A^{CORR})$$
$$= Y_B^{(UniModel)} \quad \text{for } Q_A < Q^{thresh},$$
$$\text{for } Q_A >= Q^{thesh} \text{ and } d_{A,B} > Q_A K(m \cdot d_A^{CORR})$$

where:

K, $Q_A$, and m are as defined above for continuous variables; and $Q^{thresh}$ is a user-defined quality threshold for modifying Y.

In other words, the discrete unified model $Y_A^{(UniModel)}$ and $Y_B^{(UniModel)}$ values are replaced by the discrete aggregated observation $Y_A^{(AggObs)}$ value if: a) the observation/climatology quality factor $Q_A$ exceeds a user-defined threshold $Q^{thresh}$, and b) the distance between A and B $d_{A,B}$ is less than a quality-weighted correlation distance. For locations impacted by multiple observations, a decision for replacing the discrete unified model value $Y_B^{(UniModel)}$ with any of the n qualifying neighboring observations can be made by making a discrete weighted average of the n contributions. The revised uncertainty estimate is either the original estimate for the aggregated observation $Y_A^{(AggObs)}$ or a modified version reflecting the additional processing to achieve the virtual observation at location B.

Additional consideration may be required for the cases when an observation is a proxy for a model variable but has substantially different characteristics. For example, vehicle traction systems employ sensors that provide data that can be considered observations of traction or friction. In some cases, it is desirable to relate either traction or friction to road weather conditions. For example, a very low traction value may be used to infer that a road is icy. Likewise, wipers in an "on" state may be a proxy for precipitation even though an "on" state can also mean the wipers are being used during road splash or washing fluid situations when no precipitation is occurring. While significant ambiguity exists in relating such proxy observations to model variables, it is important to include the process.

These proxy observation cases are readily addressed using the described methodology. In such cases, the quality factor $Q_A$ can be adjusted to reflect any additional uncertainty introduced by the ambiguous mapping of the observation to the related model variable. For example, imagine we are reasonably confident that a traction measurement $T^{(AggObs)}$ with range 0-1 corresponds to an icy road with probability 1 when $T^{(AggObs)}=0$ and probability 0 when $T^{(AggObs)}=0.3$. The factor $H_A$ in the equation for $Q_A$ might be then given, for example, by:

$$H_A = 1 - T_A^{(AggObs)}/0.3 \quad \text{for } T_A^{(AggObs)} <= 0.3$$
$$= 0 \quad\quad\quad\quad\quad\quad T_A^{(AggObs)} > 0.3$$

The particular formula for HA is likely to be empirical and situational, based on the nature of the sensor and how its data is transformed to determine the model equivalent. In this example, an actual observation of traction is used to generate a virtual observation of road condition. Similarly, an actual observation of wiper motor speed could be used to generate a virtual observation of precipitation rate. The inverse process can be used to relate model variables to their equivalents as measured by the mobile sensor. The particular formula that works best for any pair of model variables and proxy mobile observation, and for any parameters contained within that formula, can be refined and improved by analyses (both real-time and offline) that statistically compare forecasted values of the variable to observations.

Virtual observations can be used in a manner similar to stationary observations as input to NWP models and to post-processing. For example, for NWP model bias adjustment, the virtual observation history is input to the system incrementally (as virtual observations come available), in the same manner as data from a stationary observation. If the system can accommodate uncertainty values related to each virtual observation, that information is available. This step traditionally may employ a Model Output Statistics (MOS) or Dynamic Model Output Statistics (DMOS) process to bias correct each constituent NWP model. To do that, a time series (typically 30-90 days for DMOS) reflecting the model error (defined as Yn(OrigModel)−Yn(Virtual)) is accumulated and statistically evaluated to determine a regression fit relating model values to corresponding observations. That regression fit is used to determine a model adjustment Yn(ModelAdj), which is most commonly a simple bias but may be a more sophisticated model correction such as a temperature-dependent bias. Following the standard methodology, but using the regression based on virtual observations, for each NWP model:

$$Y_n^{(UnbiasedModel)} = Y_n^{(OrigModel)} - Y_n^{(ModelAdj)}$$

The quality of the regression fit can be determined from the regression data, and quality control can be applied as with stationary observations.

For consensus NWP combination, the virtual observation history is input to the system incrementally (as virtual observations come available), in the same manner as data from a stationary observation. The observation history is then used to compute model weights for each location. If the system can accommodate uncertainty values related to each aggregated or virtual observation, that information is available.

Error correction for current conditions and shorter-term forecasts (typically the first few hours) is performed using each virtual observation in a manner similar to a stationary observation. The extrapolation technique for virtual observation generation is used to make corrections at locations lacking current observations. If the system can accommodate uncertainty values related to each virtual observation, that information is available. This includes using the virtual observation to modify an estimate of confidence computed as part of the forecast, and using the virtual observation to flag "outlier" events for which a "blown" forecast may be substantially different from the virtual observation.

For extrapolation to non-sensor locations, with a sufficient density of mobile observations, the methodology above replaces other methods for extrapolating sensor observations to non-sensor locations.

It should be clear that a "spin up" period may be required to accumulate the needed climatology and time history before reliable virtual observations can be generated and used in post-processing. Experience with traditional post-processing indicates that this period is 30-90 days, depending on the fidelity desired.

Because virtual observations generalize the notion of an observation, the methodology works for stationary observations as well as mobile observations. For example, previously it was not possible to effectively extrapolate, with any fine-scale fidelity, fixed or stationary observations (such as from airport weather stations or RWIS) to surrounding locations that themselves lack observations. No quantitative guidance was available to identify how far from the observation location the knowledge of the observation could be applied to improve weather information. For example, it is expected conceptually that an observation at an airport in a flat geography is reflective of weather in an area around the airport that is considerably larger than for an airport in a mountainous area. The climatology and related correlation distance information developed using mobile observations, combined with geographic coverage around a stationary observation, can be used to accurately extrapolate the stationary observations within the correlation distance of the stationary observation—any location, not just along roads.

Virtual observations are robust to a lack of observational data. Two situations may occur when observations are lacking at a particular location. At locations where insufficient mobile (or stationary) observations are available to compute a reliable climatology or determine a correlation distance, the virtual observation will have the form of the original unified model value at that location, adjusted by any observations that are within the correlation distance. At locations with the additional characteristic of not being within a correlation length of an observation over the entire climatology period or in the real-time data, the virtual observation will be equal to the unified model value. With a sufficiently dense mobile observation source, such situations are expected to be rare.

By the nature of the extrapolation methods used, information will be consistent across both observation-rich locations and observation-sparse locations. In other words, locations neighboring those with no observations whatsoever will themselves have only small adjustments, ensuring spatial continuity.

FIG. 3 shows a method 300 for using mobile data to improve weather information. As shown in FIG. 3, the method 300 receives stationary observation data provided by a stationary weather station in step 310 and receives data from a plurality of input weather models 320. In step 330, the method 300 generates unified weather model estimates based on the stationary observation data and the input weather model data. The method 300, in step 340, aggregates mobile observation data provided by a plurality of non-stationary sensors. The method 300 uses the aggregated mobile observation data to adjust the unified weather model estimates in step 350. The method 300 may be performed by the system 100 described above, in particular, the weather prediction station 120 and/or the processor 130, although any suitable system or system components may be employed.

The method 300 may further determine virtual observation data based on the adjustment of the weather model estimates, the virtual observation data being an estimate of observation data that would have been provided by a non-existent stationary weather station. For example, virtual observations Yn(Virtual) may be calculated using an observation adjustment Yn(ObsAdj) of a unified model estimate Yn(UniModel) at location n.

The method 300 may also determine virtual observation data based on the adjustment of the weather model estimates by determining climatological values based on the aggregated mobile observation data and using the climatological values to determine the virtual observation data. For example, as is described above, an aggregated mobile observation of a variable in the aggregated mobile observation data for every hour over a one-month period could be averaged over that month to determine the mean value of the variable during that month at each location.

The method may also use the virtual observations as input to NWP models and to perform post-processing on a weather prediction model. For example, as described above, the virtual observation Yn(Virtual) at location n may be used in post-processing for an NWP model estimate for location n. In one particular example, a time series reflecting the model error (defined as Yn(OrigModel)−Yn(Virtual)) may be accumulated and statistically evaluated to determine a regression fit relating model values to corresponding observations. That regression fit is used to determine a model adjustment Yn(ModelAdj), which can be used for bias correction.

The step 350 of using the aggregated mobile observation data to adjust the weather model estimates may comprise spatially correlating the mobile observation data to a virtual observation location and adjusting the weather model estimates at the virtual observation location. For example, as described above, the aggregated observation data may be used to generate an observation adjustment Yn(ObsAdj) for a location n from mobile observation data at location A. The observation adjustment Yn(ObsAdj) may be used to adjust the unified model estimate Yn(UniModel) for the location n. This adjustment may determine the virtual observation Yn(Virtual) at location n.

Spatially correlating the mobile observation data to a virtual observation location may include determining a spatial correlation distance, such as the spatial correlation distance dbinCORR described above with reference to FIG. 2, defining a distance over which an observation may be usefully extrapolated to adjust the unified weather model estimates. The spatial correlation distance may have a direction and magnitude component. Accordingly, a plurality of spatial correlation distances may define a spatial correlation region of varying shapes and sizes, such as the spatial correlation region 220 shown in FIG. 2.

The mobile observation data provided by the plurality of non-stationary sensors may be of a spatiotemporal bin defined by location and time parameters previously occupied by the plurality of non-stationary sensors. For example, with reference to FIG. 2, the mobile observation data provided by the plurality of non-stationary sensors 140 may be of a spatiotemporal bin 210 that each non-stationary sensor 140 passes through over the course of the temporal parameter (e.g., 1 hour) of the spatiotemporal bin 210.

The method 300 may be implemented by software similar to what is used in NWP modeling and in standard post-processing. Accordingly, the system 100, such as the weather prediction station 120 and/or the processor 130, may be configured to perform the steps of the method 300, or similar method. As a result, the system 100 and method 300 are designed to accommodate observations of varying quality, and with unknown spatial and temporal density. The system 100 and method 300 are thus applicable to a wide range of mobile observation scenarios and may be implemented at arbitrary space-time resolution, depending on the characteristics of the available observations.

The system 100 and method 300 provides at least three improvements over use of model data without access to mobile observations. First, the model bias adjustment, made possible at all locations by the mobile observation climatology, enables fine spatial-scale improvements to model conditions/forecasts. Second, model weights for consensus combinations can be computed by location rather than assumed constant over large regions. Third, when the observations are available in real-time, they can be used to reduce model errors in real-time for current conditions and near-time forecasts. The system 100 and method 300 makes it possible to extend those improvements, through use of the correlation distance, to locations where no observations are available.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other systems and methods for using weather data to improve weather information and not just to the embodiments described above and shown in the accompanying figures. Accordingly, the scope of the embodiments described above should be determined from the following claims.

The invention claimed is:

1. A method comprising:
receiving a weather model that includes first data for a first location associated with a spatial bin and second data for a second location representing a virtual observation location;
receiving a statistical correlation calculated from a distance between the first location and the second location divided by a correlation distance for the spatial bin;
receiving aggregate mobile observation data provided by a plurality of non-stationary sensors for the spatial bin;
adjusting the second data based on a difference between the first data and the aggregate mobile observation data and the statistical correlation; and
generating a weather prediction for the virtual observation location based on the adjusted second data.

2. The method of claim 1, wherein the statistical correlation is further based on a time of day.

3. The method of claim 1, wherein the statistical correlation is further based on an annual time period.

4. The method of claim 1, wherein the weather model uses stationary observation data as input.

5. The method of claim 1, wherein the statistical correlation is further calculated using a sensitivity to the aggregate mobile observation data.

6. The method of claim 1, wherein the first data and the second data are at least an hour old.

7. The method of claim 1, wherein the aggregate mobile observation data is less than one hour old.

8. A system comprising:
a memory; and
a processor coupled to the memory, the processor being configured to:
receive a weather model that includes first data for a first location associated with a spatial bin and a second data for a second location representing a virtual observation location;
receive a statistical correlation calculated from a distance between the first location and the second location divided by a correlation distance for the spatial bin;
receive aggregate mobile observation data provided by a plurality of non-stationary sensors for the spatial bin;
adjusting the second data based on a difference between the first data and the aggregate mobile observation data and the statistical correlation; and
generate a weather prediction for the virtual observation location based on the adjusted second data.

9. The system of claim 8, wherein the statistical correlation is further based on a time of day.

10. The system of claim 8, wherein the statistical correlation is further based on an annual time period.

11. The system of claim 8, wherein the weather model uses stationary observation data as input.

12. The system of claim 8, wherein the statistical correlation is further calculated using a sensitivity to the aggregate mobile observation data.

13. The system of claim 8, wherein the first data and the second data are at least an hour old.

14. The system of claim 8, wherein the aggregate mobile observation data is less than one hour old.

15. A device comprising:
a processor; and
a memory configured with instructions to:
receive a weather model that includes first data for a first location associated with a spatial bin and second data for a second location representing a virtual observation location;
receive a statistical correlation calculated from a distance between the first location and the second location divided by a correlation distance for the spatial bin;
receive aggregate mobile observation data provided by a plurality of non-stationary sensors for the spatial bin;

adjusting the second data based on a difference between the first data and the aggregate mobile observation data and the statistical correlation; and generate a weather prediction for the virtual observation location based on the adjusted second data.

16. The device of claim 15, wherein the statistical correlation is further based on a time of day.

17. The device of claim 15, wherein the statistical correlation is further based on an annual time period.

18. The device of claim 15, wherein the weather model uses stationary observation data as input.

19. The device of claim 15, wherein the statistical correlation is further calculated using a sensitivity to the aggregate mobile observation data.

20. The device of claim 15, wherein the first data and the second data are at least an hour old.

* * * * *